(12) United States Patent
Hamasaki et al.

(10) Patent No.: US 7,118,294 B2
(45) Date of Patent: Oct. 10, 2006

(54) OPTICAL SEMICONDUCTOR MODULE AND ITS MANUFACTURING METHOD

(75) Inventors: Hiroshi Hamasaki, Hiratsuka (JP);
Hideto Furuyama, Yokohama (JP);
Hideo Numata, Yokohama (JP);
Takashi Imoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 23 days.

(21) Appl. No.: 10/898,337

(22) Filed: Jul. 26, 2004

(65) Prior Publication Data
US 2005/0063651 A1    Mar. 24, 2005

(30) Foreign Application Priority Data
Jul. 28, 2003    (JP)    ............................. 2003-202441

(51) Int. Cl.
*G02B 6/36* (2006.01)
*H01L 21/00* (2006.01)

(52) U.S. Cl. ............................. 385/89; 385/14; 385/88; 385/92; 438/29; 438/31

(58) Field of Classification Search ..................... None
See application file for complete search history.

(56) References Cited

U.S. PATENT DOCUMENTS 6,517,259 B1 * 2/2003 Murata ........................ 385/92

FOREIGN PATENT DOCUMENTS

| JP | 2000-206376 | 7/2000 |
| JP | 2001-59924 | 3/2001 |
| JP | 2002-250846 | 9/2002 |

* cited by examiner

*Primary Examiner*—Brian Healy
*Assistant Examiner*—Derek L. Dupuis
(74) *Attorney, Agent, or Firm*—Oblon, Spivak, McClelland, Maier & Neustadt, P.C.

(57) ABSTRACT

An optical semiconductor module comprises an optical transmission channel including a waveguide transmitting a light beam, a holding member whose holding member holds the channel with the end of the channel being exposed from the surface, electric wiring formed on the surface, an optical semiconductor element, mounted above the surface, including an active area to emit or receive a light beam and an electrode pad electrically connected to the electric wiring, the active area optically coupled to the waveguide at the end of the channel, and an electrical insulation film between the optical semiconductor element and the holding member, including openings each corresponding to an electrical connection between the electrode pad and the electric wiring, and an optically coupling portion between the active area and the waveguide, the electrical insulation film being in contact with a portion of the end of the channel.

4 Claims, 6 Drawing Sheets

OPTICAL SEMICONDUCTOR MODULE AND ITS MANUFACTURING METHOD

CROSS-REFERENCE TO RELATED APPLICATIONS

This application is based upon and claims the benefit of priority from prior Japanese Patent Application No. 2003-202441, filed Jul. 28, 2003, the entire contents of which are incorporated herein by reference.

BACKGROUND OF THE INVENTION

1. Field of the Invention

The present invention relates to an optical semiconductor module for optical communication or transmission techniques. More particularly, it relates to an optical semiconductor module in which the coupling structure of an optical semiconductor element and optical transmission channel is improved, and its manufacturing method.

2. Description of the Related Art

In optical communication and transmission techniques, it is necessary to optically couple an optical semiconductor element, such as a light emission element or light reception element, to an optical transmission channel formed of, for example, an optical fiber. As one type of optical coupling, a so-called butt joint system is now being researched and developed, in which optical fibers and an optical semiconductor element are closely opposed to each other and optically coupled without a lens.

When using the butt joint system, it is important to closely locate an optical semiconductor element and optical fibers so that light does not reach an unnecessary portion of each optical fiber. Moreover, it is necessary to employ a technique for preventing the end faces of the optical fibers closely opposing the active areas of the optical semiconductor element from colliding with the active areas. Accordingly, a mechanism is required which can perform not only positioning in the direction parallel to the end face of each optical fiber, but also axial positioning.

Jpn. Pat. Appln. KOKAI Publication No. 2000-206376, for example, discloses a method for axially positioning optical fibers and an optical semiconductor element. In this method, a component is beforehand prepared by protruding optical fibers from an optical fiber holder, then accurately positioning the fibers and fixing them in position. The distance between the holder and an optical semiconductor element is controlled using a spherical spacer, thereby axially positioning the optical fibers and optical semiconductor element. Since the relative positions of the holder and optical semiconductor element are determined by the spherical spacer, and the optical fibers are protruded from the holder by a predetermined distance, an accurate fixing technique is required, which increases the manufacturing cost.

Further, Jpn. Pat. Appln. KOKAI Publication No. 2002-250846 discloses a technique for placing an optical semiconductor element on a plate with electric wiring, and positioning the optical semiconductor element and optical fibers with the plate interposed. In this technique, the distance between the optical semiconductor element and fiber end faces depends on the thicknesses of the plate, wiring and a bump needed for mounting the element, which makes it difficult to closely oppose the optical semiconductor element and fiber end faces. Furthermore, when mounting a plurality of optical semiconductor elements on the plate, it is necessary to match the configuration (heights) of the bump with all the elements. This is a very difficult technique and hence inevitably increases the mounting cost.

In addition, Jpn. Pat. Appln. KOKAI Publication No. 2001-59924 discloses a structure in which dummy bumps are located in positions on an optical semiconductor element other than the active areas of the element, the positions corresponding to the claddings of optical fibers, and the bumps are pressed against the end faces of the fibers after they are connected to wiring provide on a holding member, thereby aligning the axial positions of the optical semiconductor element and fibers. Thus, this structure uses dummy bumps. Therefore, if a plurality of optical semiconductor elements are mounted, it is necessary to adjust a large number of dummy bumps on the semiconductor elements to a certain height, or to take measures so as to prevent the bumps and/or elements from inclining when they are mounted. These things may well increase the mounting cost.

As stated above, when the butt joint system is used for optical coupling of an optical transmission channel and optical semiconductor element, it is difficult to shorten the distance between the optical semiconductor element and the opposing end face of the optical transmission channel, although it is desirable to locate them very closely. It is also difficult to reliably control the distance between a plurality of optical semiconductor elements and the optical transmission channel, or the inclination of the semiconductor elements. These things increase the mounting cost.

BRIEF SUMMARY OF THE INVENTION

According to a first aspect of the invention, there is provided an optical semiconductor module comprising:

an optical transmission channel including a waveguide which transmits a light beam, and an end at which a part of the waveguide is exposed;

a holding member including a surface, the holding member mechanically holding the optical transmission channel with the end of the optical transmission channel being exposed from the surface;

electric wiring formed on the surface of the holding member;

an optical semiconductor element, being faced with the surface of the holding member, including an active area to emit or receive a light beam and an electrode pad being electrically connected to the electric wiring, the active area being optically coupled to the waveguide at the end of the optical transmission channel; and an electrical insulation film interposed between the optical semiconductor element and the holding member, including a plurality of openings each corresponding to an electrical connection between the electrode pad and the electric wiring, and an optically coupling portion between the active area of the optical semiconductor element and the waveguide of the optical transmission channel, the electrical insulation film being in contact with a portion of the end of the optical transmission channel.

According to a second aspect of the invention, there is provided a method of producing the optical semiconductor module as specified in the first aspect, comprising:

adhering an insulation film to the surface of the holding member with electric wiring provided thereon;

mounting the optical semiconductor element on the surface of the holding member with the insulation film interposed therebetween, and electrically connecting the electric wiring to the electrode pad of the optical semiconductor element;

mounting the optical transmission channel on the holding member; and fixing the optical transmission channel to the holding member after bringing the end portion of the optical transmission channel into contact with the insulation film, the end portion of the optical transmission channel being other than the waveguide inserted through the optical transmission channel.

According to a third aspect of the invention, there is provided a method of producing the optical semiconductor module as specified in the first aspect, comprising:

adhering the insulation film to a surface of the optical semiconductor element;

mounting the optical semiconductor element on the surface of the holding member provided with electric wiring, with the insulation film interposed therebetween, and electrically connecting the electric wiring to the electrode pad of the optical semiconductor element;

mounting the optical transmission channel on the holding member; and fixing the optical transmission channel to the holding member after bringing the end portion of the optical transmission channel into contact with the insulation film, the end portion of the optical transmission channel being other than the waveguide inserted through the optical transmission channel.

According to a fourth aspect of the invention, there is provided An optical semiconductor module comprising:

an optical transmission channel including a waveguide which transmits a light beam, and an end at which a part of the waveguide is exposed;

a holding member including a surface, the holding member mechanically holding the optical transmission channel with the end of the optical transmission channel being exposed from the surface;

an optical semiconductor element, being mounted above the principal surface of the holding member, including an active area to emit or receive a light beam and an electrode pad being electrically connected to the electric wiring, the active area being optically coupled to the waveguide at the end of the optical transmission channel; and a three-layer film interposed between the optical semiconductor element and the holding member, the three-layer film including an insulation layer, a wiring layer and an adhesive layer, the three-layer film including a plurality of openings each corresponding to an optically coupling portion between the active area of the optical semiconductor element and the waveguide of the optical transmission channel, the adhesive layer being adhered to the surface of the holding member, the wiring layer being electrically connected to an electrode pad of the optical semiconductor element, a portion of the end of the optical transmission channel being pressed against the wiring layer or the insulation layer.

According to a fifth aspect of the invention, there is provided a method of producing the optical semiconductor module as specified in the fourth aspect, comprising:

adhering the three-layer film to the surface of the holding member;

mounting the optical semiconductor element on the surface of the holding member with the three-layer film provided thereon, and electrically connecting the electrode pad of the optical semiconductor element to the wiring layer included in the three-layer film;

mounting an optical transmission channel on the holding member; and fixing the optical transmission channel to the holding member after bringing the end portion of the optical transmission channel into contact with the wiring layer or the insulation layer, the end portion of the optical transmission channel being other than the waveguide inserted through the optical transmission channel.

DETAILED DESCRIPTION OF THE INVENTION

Embodiment of the invention will be described in detail with reference to the accompanying drawings.

(First Embodiment)

Figure 1:
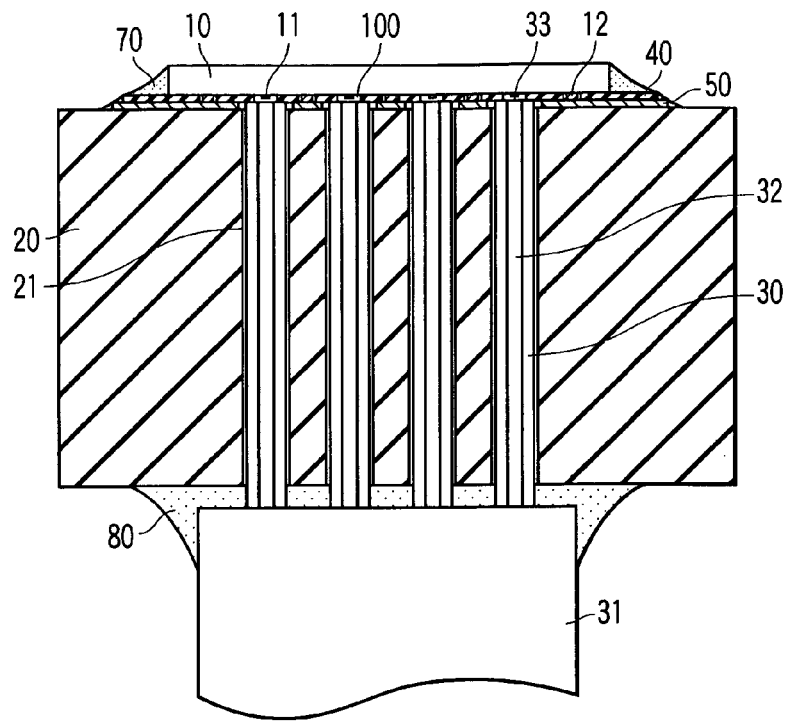
FIG. 1 is a schematic sectional view illustrating an optical semiconductor module according to a first embodiment of the invention.

FIG. 1 is a schematic sectional view illustrating an optical semiconductor module according to a first embodiment of the invention.

In FIG. 1, reference numeral 10 denotes an optical semiconductor element, in which active areas 11 serving as light emission or reception areas are formed on the surface (in the figure, the lower surface) thereof. The active areas 11 are formed at predetermined positions. Further, a plurality of bumps (electrodes) 12 for electrical connection are provided on the surface of the optical semiconductor element 10.

Reference numeral 20 denotes an optical transmission channel holding member for mechanically holding optical transmission channels 30 formed of, for example, respective optical fibers. The holding member 20 has a plurality of holding holes 21 having a diameter slightly larger than that of each optical fiber, like an optical fiber ferrule. The holding holes 21 extend through the holding member 20 from the upper surface to the lower surface thereof.

Behind the holder member 20, the optical transmission channels 30 may be kept separate from each other, or may be gathered as one body using a cover 31. Each optical transmission channel 30 has a waveguide portion 32 through which optical signals are transmitted. For instance, if each optical transmission channel 30 is formed of an optical fiber having a core coated with a cladding layer, the waveguide 32 corresponds to the core. Electric wiring 50 is provided on the surface of the holding member 20 for supplying power to the optical semiconductor element 10 and transferring input and output signals to and from the element 10.

The optical semiconductor element 10 is mounted on the surface of the holding member 20, the electric wiring (not shown) of the element 10 is electrically connected to electric wiring 50 on the holding member 20 by a bump 12.

Reference numeral 40 denotes an electrical insulation film formed of, for example, polyimide or glass, and adhered to the electric wiring 50 of the holding member 20. The insulation film 40 has openings in portions thereof corresponding to optical coupling portion 100 that are formed between the active areas 11 of the optical semiconductor element 10 and the waveguides 32 of the optical transmission channels 30, and corresponding to the bump 12 for electrical connection. At optical input/output end faces 33 of the optical transmission channels 30, the insulation film 40 is in contact with the portions of the optical transmission channels 30 that are other than the waveguides 32.

Reference numeral 70 denotes a resin for fixing the optical semiconductor element 10 on the holding member 20. This resin is, for example, a silicone-based material, acrylic-based material or epoxy-based material. The resin 70 is also provided between the optical semiconductor element 10 and the light input/output end faces 33 of the optical transmission channels 30, and also functions as protection layers for the active areas 11 of the optical semiconductor element 10.

The refractive index of the resin 70 is set to an intermediate value between that of the waveguides 32 of the optical transmission channels 30 and that of the active areas 11 of the optical semiconductor element 10. This provides a so-called under-filling structure in which a refractive index adjusting material is embedded between the waveguides 32 and active areas 11. In this structure, the reflection at the light input/output end face of each optical transmission channel 30 can be minimized, thereby reducing noise due to reflected light. The refractive index of the resin 70 may be made substantially equal to that of the waveguide 32 of each optical transmission channel 30.

If the refractive index of the resin 70 is set to an intermediate value between that of the waveguides 32 and that of the active areas 11, or set substantially equal to that of the waveguide 32, enhancement of the optical coupling efficiency can be expected. This is because the degree of diversion of the light passing through the resin 70 is lower that of the light passing through the air. Reference numeral 80 denotes an adhesive for fixing the holding member 20. The adhesive 80 may be formed of the resin 70.

In the above structure, if the bump 12 is crushed when the optical semiconductor element 10 is mounted on the holding member 20, the active-area-side surface of the element 10 can be brought into substantial contact with the insulation film 40. Accordingly, the distance between the surface of the optical semiconductor element 10 and the light input/output end face 33 of the optical transmission channel 30 can be made substantially equal to the thickness of the insulation film 40. The step between the surface of the optical semiconductor element 10 and each active area 11 is a device design, and is determined by the semiconductor manufacturing process. Therefore, the step can be set substantially constant, and hence the distance between the optical semiconductor element 10 and each optical transmission channel 30 can be set substantially constant. This being so, neither a particular positioning device nor mounting accuracy is required, which enables an optical module to be prepared at a low mounting cost.

If a polyimide film, for example, is used as the insulation film 40, a polyimide insulation film having a thickness of about 25 µm is available. If a glass film is used as the insulation film 40, a glass insulation film having a thickness of about 30 µm is available. Therefore, it is easy to make the distance between the optical semiconductor element 10 and each optical transmission channel 30 close to about 25 to 30 µm. As a result, an optical semiconductor module that generates little noise and can operate at a high rate can be realized. It was confirmed from the experiments conducted by the inventors of the present invention that if the thickness of the insulation film 40 is not more than 50 µm, reduction of the optical coupling efficiency between the active areas 11 of the optical semiconductor element 10 and the waveguides 32 of the optical transmission channels 30 can be sufficiently suppressed.

And if the thickness of the insulation film 40 is less than 12.5 µm, it will become easy that the stress between metal of the electrode on the film and insulator breaks the insulation film 40.

Figure 2:
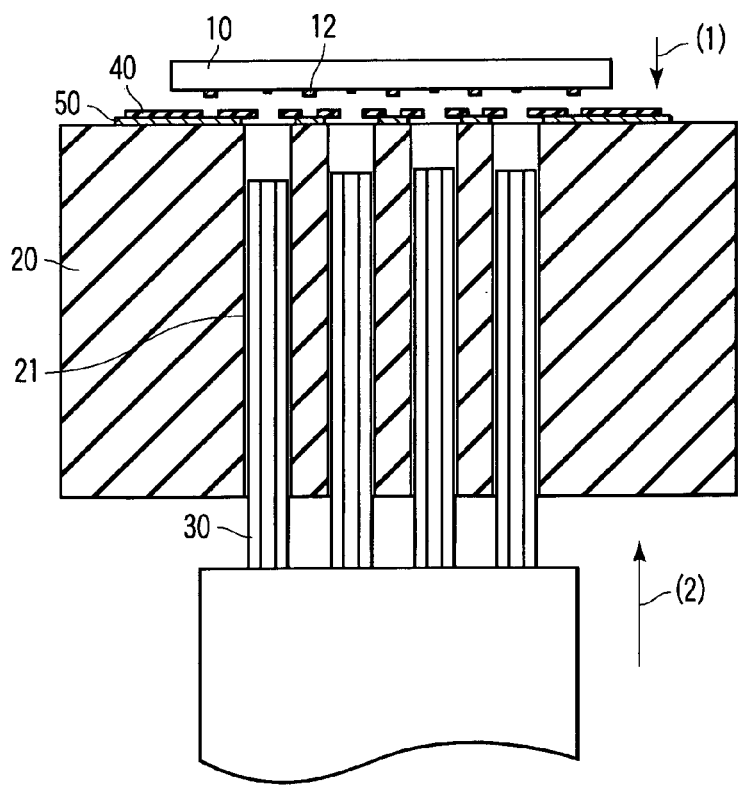
FIG. 2 is a sectional view useful in explaining a method for manufacturing the optical semiconductor module of FIG. 1.

The above optical semiconductor module can be produced in the following manner. FIG. 2 is a sectional view useful in roughly explaining a method for manufacturing the optical semiconductor module of FIG. 1.

As shown in FIG. 2, bumps 12 for connecting the optical semiconductor element 10 to an external device are formed as parts of the electric wiring of the element 10. The bumps 12 are plated or stud bumps formed of Au wires. Alternatively, the bumps may be formed of a laminated layer of solder, Cu, Au, Ag, Ni, Pt, Pd, Sn, etc. Electric wiring 50 is formed beforehand, by plating, sputtering or deposition, on the surface of the optical transmission channel holding member 20.

Firstly, as described above, the insulation film 40 is adhered to the electric wiring 50. After that, opening are formed, by, for example, laser abrasion, in the portions corresponding to the optical coupling portions and bump connection positions.

Subsequently, the optical semiconductor element 10 with the bumps is mounted, by, for example, flip-chip bonding, on the insulation film 40, aligned with the optical transmission channel holding holes 21 (indicated by the arrow (1) in FIG. 2). At this time, the heights of the bumps 12 and the conditions, such as pressure, during bonding are adjusted so that the electrical and mechanical characteristics will fall within designed value ranges when the optical semiconductor element 20 is brought into substantial contact with the insulation film 40. Thereafter, optical transmission channels 30 are inserted into the holding holes 21 as indicated by the arrow (2) in FIG. 2. At this point in time, the end faces of the optical transmission channels 30 may be positioned in different positions.

After that, the optical transmission channels 30 are pushed until the input/output end faces of the lines 30 are brought into contact with the insulation film 40, and are fixed on the holding member 20 by an adhesive (not shown).

At this time, it is desirable to fix the holding member 20 and optical semiconductor element 10 by an assembly jig so that no force will be exerted on the element 10 and wiring 50 in a direction in which they are separated. Thereafter, a transparent resin (not shown) as an under-filling resin is flown along the lower surface of the optical semiconductor element 10 and hardened, which is the termination of the attachment.

In the above process, the end faces of the optical transmission channels 30 can be easily exposed by, for example, cleavage, and can be aligned with each other without the trouble of polishing. Further, since the optical semiconductor element 10 is mounted before the optical transmission channels 30 are inserted, no particular handling precautions are required for mounting, or there is no temperature limitation when using the adhesive.

Figure 3:
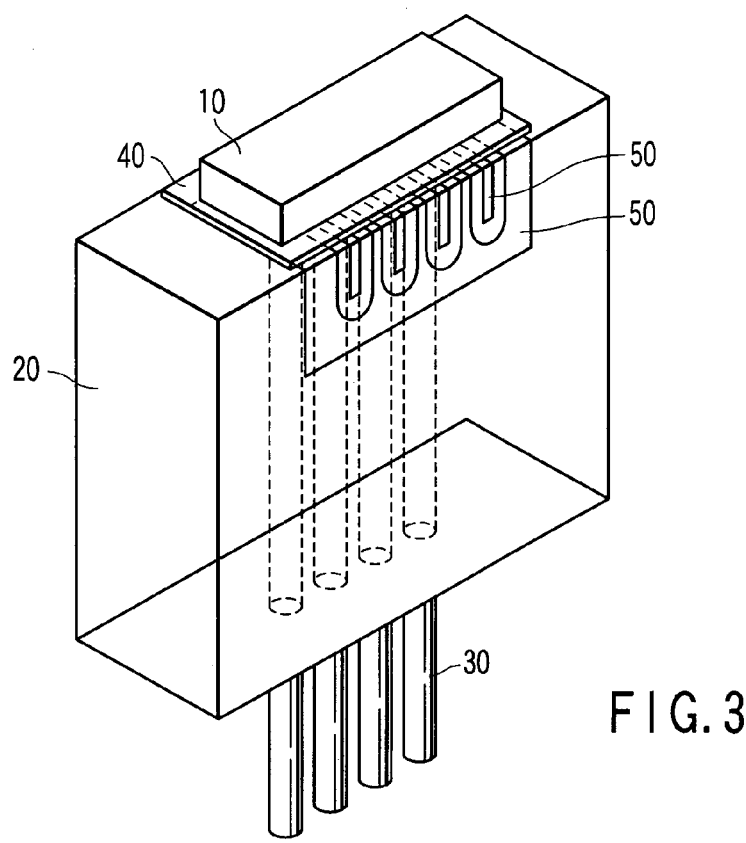
FIG. 3 is a perspective view illustrating a modification of the optical semiconductor module of the first embodiment.

Further, the electric wiring 50 provided on the surface of the holding member 20 may be extended to a side surface of the holding member 20 as shown in FIG. 3. In this case, the degree of freedom concerning the position for connecting the wiring 50 to an external circuit is enhanced, which enables the entire optical module to be thinned and/or reduced in size. The corner of the surface and side surface of the holding member 20, on which the electric wiring 50 is provided, may be chamfered. This can eliminate abrupt bending of the electric wiring 50 at the corner, thereby preventing the electric wiring 50 from, for example, being broken.

As described above, in the embodiment, the end faces of the optical transmission channels 30 can be easily exposed by, for example, cleavage, and can be aligned with each other without the trouble of polishing. This can significantly simplify the process, and hence can provide an inexpensive optical module. Further, since the optical semiconductor element 10 is mounted before the optical transmission channels 30 are inserted, no particular handling precautions are required for mounting, or there is no temperature limitation when using the adhesive. This increases the degree of freedom for mounting, and can shorten the tact time, resulting in the reduction of the manufacturing cost.

Moreover, the distance between the optical semiconductor element 10 and the light input/output end face of each optical transmission channel 30 is determined by the thickness of the insulation film 40. Accordingly, the distance between the optical semiconductor element and the light input/output end face of each optical transmission channel can be reduced to about several tens micrometers by reducing the thickness of the insulation film 40. This enables excessive noise due to diffused light to be suppressed, therefore enables high-rate signal transmission. In addition, since the distance between the optical semiconductor element 10 and the light input/output end face of each optical transmission channel 30 is determined by the thickness of the insulation film 40, the distance therebetween can be easily controlled at a number of portions, which leads to an inexpensive optical semiconductor module.

In short, the distance between the optical semiconductor element 10 and the light input/output end face of each optical transmission channel 30 can be shortened, and the axial positioning of the semiconductor element 10 and transmission channel 30 can be simplified. Even when a plurality of optical semiconductor elements are mounted, the optical semiconductor module can be manufactured at low cost.

(Second Embodiment)

Figure 4:
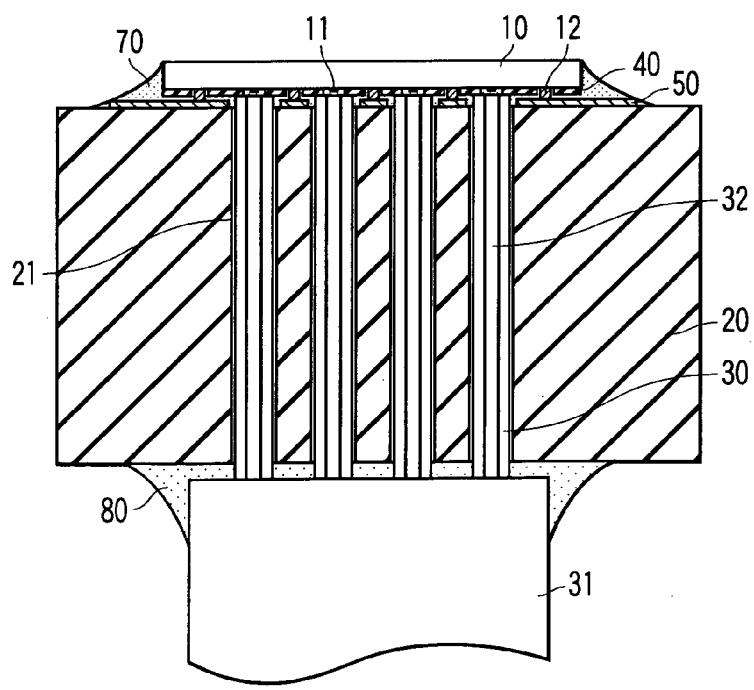
FIG. 4 is a schematic sectional view illustrating an optical semiconductor module according to a second embodiment of the invention.

FIG. 4 is a schematic sectional view illustrating an optical semiconductor module according to a second embodiment of the invention. In FIG. 2, elements similar to those in FIG. 1 are denoted by corresponding reference numerals, and no detailed description is given thereof.

The second embodiment differs from the above-described first embodiment in that in the former, the insulation film 40 is not formed on the holding member 20, but on the surface of the optical semiconductor element 10 on which the active areas 11 are provided. In the second embodiment, the height of each bump 12 does not influence the distance between the optical semiconductor element 10 and each optical transmission channel 30, therefore the degree of freedom in mounting is enhanced and the manufacturing cost can be further reduced.

Figure 5:
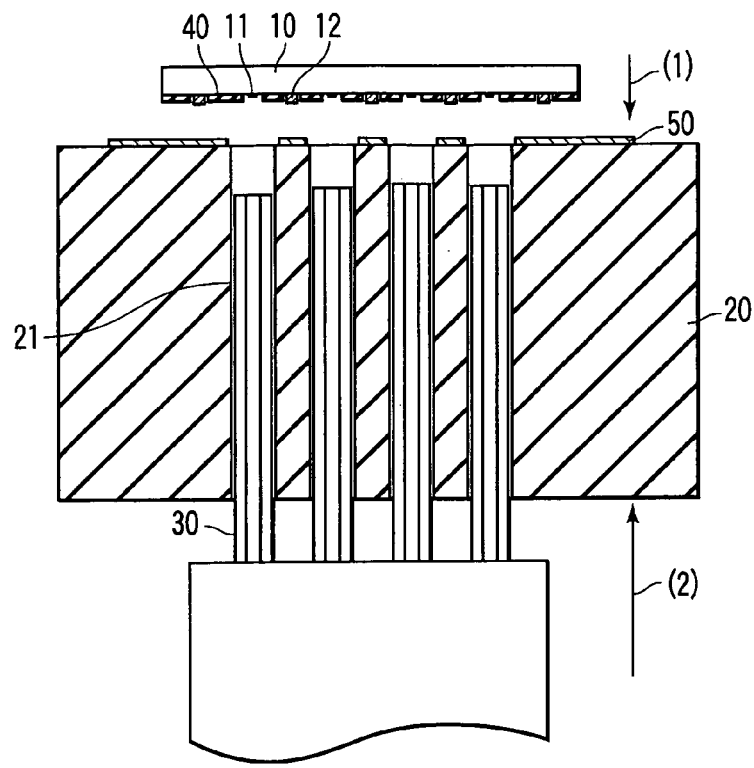
FIG. 5 is a sectional view useful in explaining the outline of a method for manufacturing the optical semiconductor module of FIG. 4.

FIG. 5 is a sectional view useful in explaining the outline of a method for manufacturing the optical semiconductor module of FIG. 4.

Firstly, the insulation film 40 is attached to the surface of the optical semiconductor element 10. At this time, an insulation film 40 having opening in positions corresponding to the active areas and bump areas may be attached by, for example, an adhesive. Alternatively, after an insulation film 40 having no opening is attached, openings may be formed by, for example, laser abrasion. Yet alternatively, photosensitivity may be imparted to an insulation film 40 so that openings can be formed in the film by photolithography.

Subsequently, the bumps 12 for connecting the optical semiconductor element 10 to an external device are formed on the electrode pads (not shown) of the element 10 that correspond to the openings of the insulation film 40. The bumps 12 are plated or stud bumps formed of Au wires. Alternatively, the bumps may be formed of a laminated layer of solder, Cu, Au, Ni, Pt, Pd, etc. Electric wiring 50 is formed beforehand, by plating, sputtering or deposition, on the surface of the optical transmission channel holding member 20.

After that, the optical semiconductor element 10 with the insulation film 40 and bumps 12 is mounted, by, for example, flip-chip bonding, on the electric wiring 50, aligned with the optical transmission channel holding holes 21 (indicated by the arrow (1) in FIG. 5). At this time, the heights of the bumps 12 and the conditions, such as pressure, during bonding are adjusted so that the electrical and mechanical characteristics will fall within designed value ranges when the optical semiconductor element 20 is brought into substantial contact with the insulation film 40. Thereafter, optical transmission channels 30 are inserted into the holding holes 21 as indicated by the arrow (2) in FIG. 5. At this point in time, the end faces of the optical transmission channels 30 may be positioned in different positions.

Thereafter, the optical transmission channels 30 are pushed until the input/output end faces of the lines 30 are brought into contact with the insulation film 40, and are fixed on the holding member 20 by an adhesive (not shown). At this time, it is desirable to fix the holding member 20 and optical semiconductor element 10 by an assembly jig so that no force will be exerted on the element 10 and wiring 50 in a direction in which they are separated. Thereafter, a transparent resin (not shown) as an under-filling resin is flown along the lower surface of the optical semiconductor element 10 and hardened, which is the termination of the attachment.

Since in this method, a wafer process can be applied to the formation of the insulation film 40, a more inexpensive optical module can be produced. Further, like the first embodiment, the end faces of the optical transmission channels 30 can be easily exposed by, for example, cleavage, and can be aligned with each other without the trouble of polishing. This can significantly simplify the process, and hence can provide an inexpensive optical module. Further, since the optical semiconductor element 10 is mounted before the optical transmission channels 30 are inserted, no particular handling precautions are required for mounting, or there is no temperature limitation when using the adhesive. This increases the degree of freedom for mounting, and can shorten the tact time, resulting in the reduction of the manufacturing cost.

Moreover, the distance between the optical semiconductor element 10 and the light input/output end face of each optical transmission channel 30 is determined by the thickness of the insulation film 40. Accordingly, the distance between the optical semiconductor element and the light input/output end face of each optical transmission channel can be reduced to about several tens micrometers by reducing the thickness of the insulation film 40. This enables excessive noise due to diffused light to be suppressed, therefore enables high-rate signal transmission. In addition, since the distance between the optical semiconductor element 10 and the light input/output end face of each optical transmission channel 30 is determined by the thickness of the insulation film 40, the distance therebetween can be easily controlled at a number of portions, which leads to an inexpensive optical semiconductor module.

Figure 6:
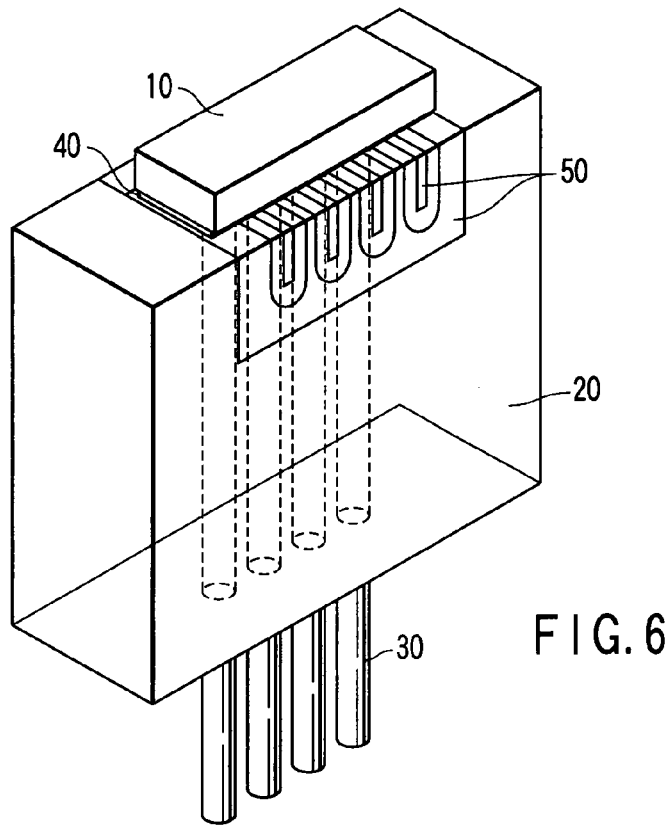
FIG. 6 is a perspective view illustrating a modification of the optical semiconductor module of the second embodiment.

The electric wiring 50 provided on the surface of the optical transmission channel holding member 20 may be extended to a side surface of the holding member 20 as shown in FIG. 6. In this case, the degree of freedom concerning the position for connecting the wiring 50 to an external circuit is enhanced, which enables the entire optical module to be thinned and/or reduced in size.

(Third Embodiment)

Figure 7:
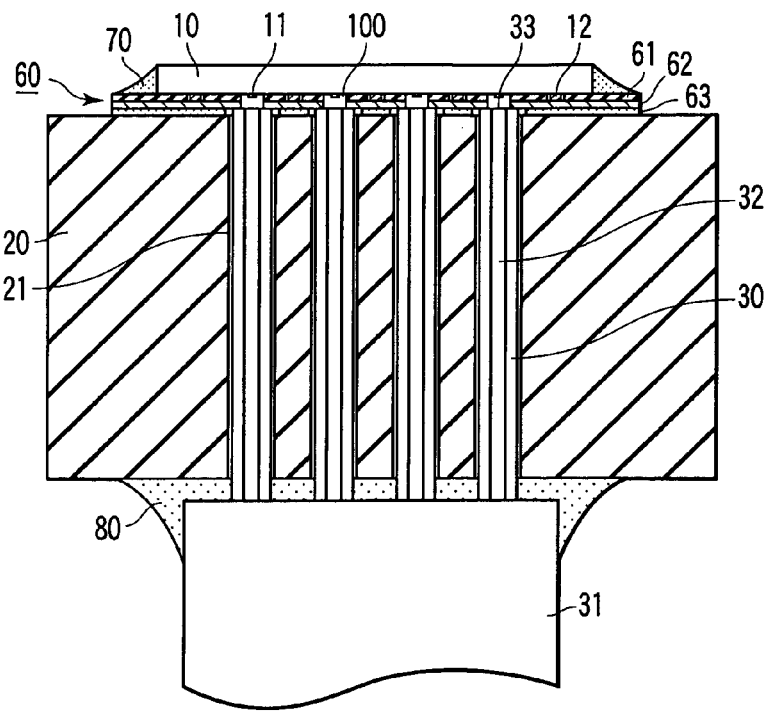
FIG. 7 is a schematic sectional view illustrating an optical semiconductor module according to a third embodiment of the invention.

FIG. 7 is a schematic sectional view illustrating an optical semiconductor module according to a third embodiment of the invention. In FIG. 7, elements similar to those in FIG. 1 are denoted by corresponding reference numerals, and no detailed description is given thereof.

The third embodiment differs from the above-described first embodiment in that in the former, a three-layer film 60 that is formed of an insulation film 61, wiring layer 62 and adhesive layer 63 stacked on each other is provided instead of the insulation film 40 and wiring 50. Specifically, a wiring layer 62 is provided on a surface of an insulation film 61, and an adhesive layer 63 is adhered to the wiring layer 62. The adhesive layer 63 is also adhered to the surface of the holding member 20, and the optical semiconductor layer 10 is mounted on the insulation layer 61.

The three-layer film 60 has openings in portions thereof corresponding to the optical coupling portions 100 between the active areas 11 of the optical semiconductor element 10 and the waveguides 32 of the optical transmission channels 30, and also corresponding to the bumps 12 for electrical connection. More specifically, openings having a diameter larger than the waveguide 32 of each optical transmission channel 30 and smaller than the diameter of the entire optical transmission channel 30 are formed in the portions of the insulation layer 61 and wiring layer 62 that correspond to the optical coupling portions 100 between the active areas 11 of the optical semiconductor element 10 and the waveguides 32 of the optical transmission channels 30. Further, openings larger than the optical transmission channel holding holes 21 are formed in the portions of the adhesive layer 63 that correspond to the optical coupling portions 100. Furthermore, openings are formed in the portions of the insulation layer 61 that correspond to the bumps 12 for electrical connection. The portion of the input/output end face 33 of each optical transmission channel 30 other than the waveguide 32 is in contact with the wiring layer 62.

In the above structure, the wiring layer 62, which is rigid, is used to position the tip of each optical transmission channel 30. This is advantageous in positioning, although the distance between the optical semiconductor element 10 and optical transmission channel 30 becomes longer by the thickness of the wiring layer 62.

Figure 8:
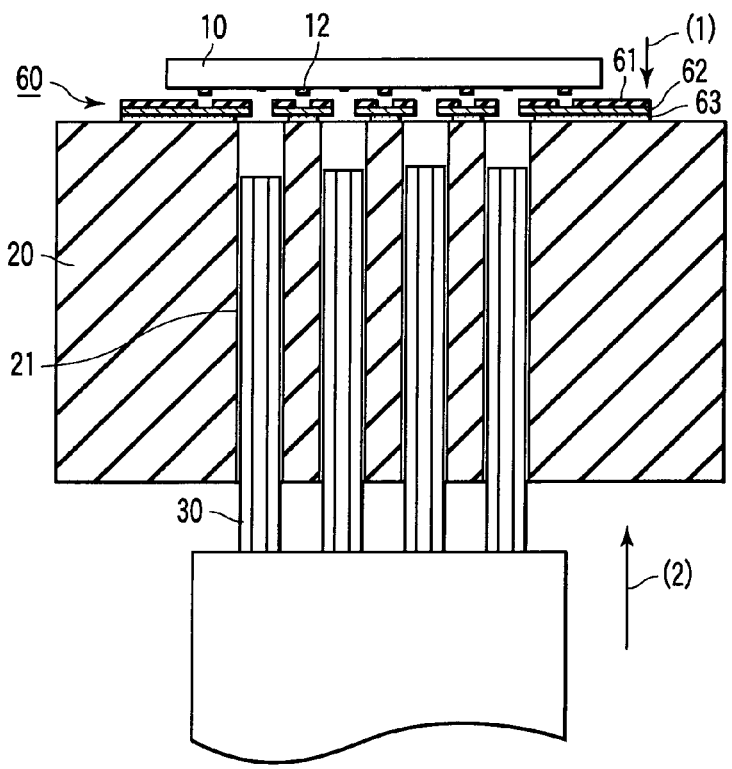
FIG. 8 is a sectional view useful in explaining a method for manufacturing the optical semiconductor module of FIG. 7.

FIG. 8 is a sectional view useful in explaining the outline of a method for manufacturing the optical semiconductor module of FIG. 7.

Firstly, the three-layer film 60 that is formed of the insulation layer 61, wiring layer 62 and adhesive layer 63 stacked on each other is prepared. The wiring layer 62 of the film 60 has an optimal pattern corresponding to the semiconductor element. The insulation layer 61 has openings at positions corresponding to the optical coupling portions 100 and bumps 12.

Subsequently, the three-layer film 60 is adhered to the surface of the holding member 20, with the adhesive layer 63 directly in contact with the surface.

After that, the optical semiconductor element 10 with the bumps is mounted, by, for example, flip-chip bonding, on the three-layer film 60, aligned with the optical transmission channel holding holes 21 (indicated by the arrow (1) in FIG. 8). At this time, the heights of the bumps 12 and the conditions, such as pressure, during bonding are adjusted so that the electrical and mechanical characteristics will fall within designed value ranges when the optical semiconductor element 20 is brought into substantial contact with the three-layer film 60. Thereafter, optical transmission channels 30 are inserted into the holding holes 21 as indicated by the arrow (2) in FIG. 8. At this point in time, the end faces of the optical transmission channels 30 may be positioned in different positions.

Thereafter, the optical transmission channels 30 are pushed until the input/output end faces of the lines 30 are brought into contact with the wiring layer 62, and are fixed on the holding member 20 by an adhesive (not shown). At this time, it is desirable to fix the holding member 20 and optical semiconductor element 10 by an assembly jig so that no force will be exerted on the element 10 and three-layer film 60 in a direction in which they are separated. Thereafter, a transparent resin (not shown) as an under-filling resin is flown along the lower surface of the optical semiconductor element 10 and hardened, which is the termination of the attachment.

Figure 9:
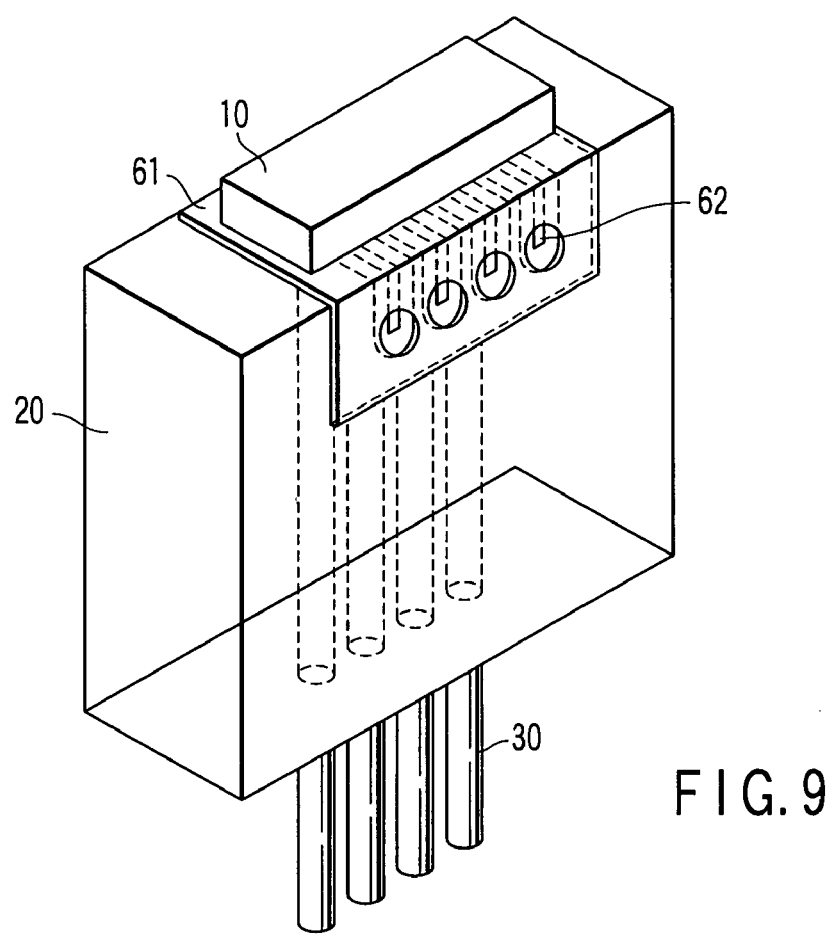
FIG. 9 is a perspective view illustrating a modification of the optical semiconductor module of the third embodiment.

Further, the three-layer film 60 formed on the surface of the holding member 20 may be extended to a side surface of the holding member 20 as shown in FIG. 9. In this case, the degree of freedom concerning the position for connecting the wiring layer 62 to an external circuit is enhanced, which enables the entire optical module to be thinned and/or reduced in size.

Although in the embodiment, the optical transmission channels 30 are brought into contact with the wiring layer 62 of the three-layer film 60, they may be brought into contact with the insulation layer 61 by making the opening diameter of the wiring layer 62 larger than the diameter of the optical transmission channels 30. In this case, the insulation layer 61 is used to position the tip of each optical transmission channel 30, thereby further shortening the distance between the optical semiconductor element 10 and optical transmission channels 30.

(Fourth Embodiment)

Figure 10:
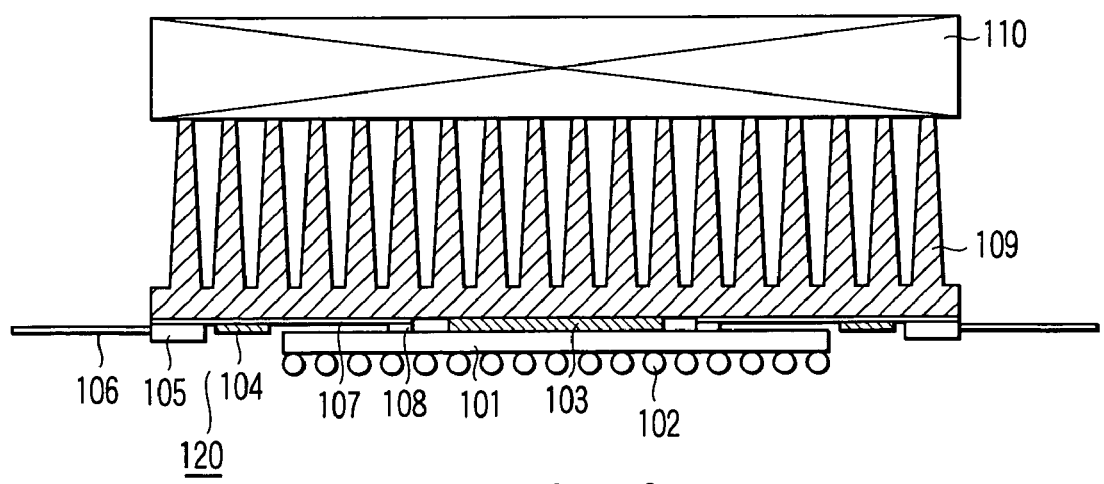
FIG. 10 is a schematic sectional view illustrating an optical semiconductor package according to a fourth embodiment.

FIG. 10 is a schematic sectional view illustrating an optical semiconductor package according to a fourth embodiment.

The fourth embodiment is directed to a semiconductor package using each of the optical semiconductor elements of the first to third embodiments.

In FIG. 10, reference numeral 101 denotes a ball grid array (BGA) interposer plate, reference numeral 102 solder balls provided on the lower surface of the interposer plate 101, and reference numeral 103 a signal processing LSI mounted on the upper surface of the interposer plate 101. Further, reference numeral 104 denotes an optical element driving IC, reference numeral 105 a photoelectric converter, reference numeral 106 an optical fiber, and reference numeral 107 a wiring board. The optical element driving IC 104 and photoelectric converter 105 are provided on the lower surface of the wiring board 107. Reference numeral 108 denotes an anisotropic conductive film, reference numeral 109 a heat sink, and reference numeral 110 a cooling fan.

The BGA interposer plate 101 may be of an electrode form, such as a pin grid array (PGA) or land grid array (LGA). The photoelectric converter 105 contains a semiconductor laser and light-receiving element optically coupled to the optical fiber, and an electrode is lead from the converter to enable the converter to be electrically connected to the optical element driving IC 104. The optical element driving IC 104 may be contained in the photoelectric converter 105. The combination of the optical element driving IC 104, photoelectric converter 105 and wiring board 107 will be referred to as an "optical interface module 120".

A high-rate signal from the signal processing LSI 103 is not supplied to a mounting board via the solder balls, but to the optical element driving IC 104 via the anisotropic conductive film 108 and wiring board 107. This signal is converted into an optical signal by the photoelectric converter 105, and supplied to the optical fiber 106. The interposer functions to connect a semiconductor chip to a motherboard in an IC package. The interposer is formed of, for example, a lead frame, TAB tape or resin board.

The uppermost surfaces of the signal processing LSI 103 and interface module 120 (optical element driving IC 104, photoelectric converter 105 and wiring board 107) are nearly level. The signal processing LSI 103 and interface module 120 are in tight contact with the lower surface of the heat sink 109 via, for example, a heat transmitting grease.

In the semiconductor package constructed as above, one of the optical semiconductor modules of the first to third embodiments is used as the unit of the photoelectric converter 105 and optical fiber 106. Accordingly, the distance between the semiconductor laser or light-receiving element of the photoelectric converter 105 and the tip of the optical fiber 106 can be shortened. Further, the axial positioning of the semiconductor laser or light-receiving element of the photoelectric converter 105 and the optical fiber 106 can be simplified. Therefore, even when the semiconductor package incorporates a plurality of semiconductor lasers and light receiving elements, it can be produced at low cost.

(Modification)

The present invention is not limited to the above-described embodiments. For example, the material of the insulation film interposed between the optical semiconductor element and holding member is not limited to polyimide or glass, but may be changed in accordance with the specifications. Further, the insulation film may be provided as the uppermost layer by deposition, instead of adhesion.

Figure 11A:
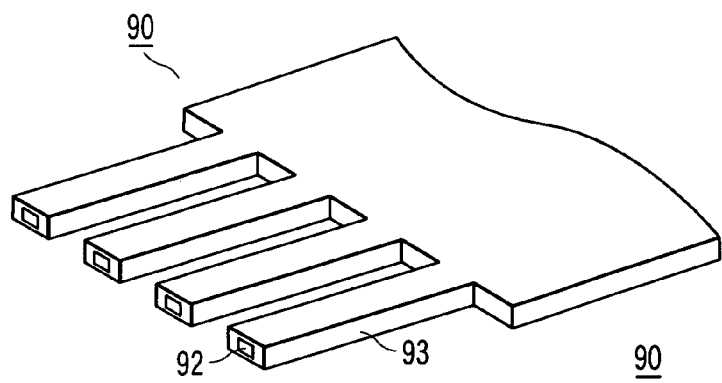
FIGS. 11A and 11B are perspective views useful in explaining modifications, illustrating examples of waveguide films.
Figure 11B:
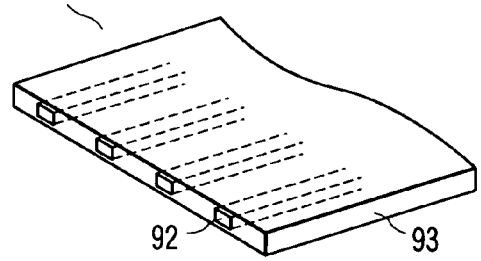

In addition, the waveguide films 90 as shown in FIGS. 11A and 11B may be used as the optical waveguide, instead of optical fibers. In FIGS. 11A and 11B, reference numeral 92 denotes a linear core, and reference numeral 93 a film-type cladding around the core 92.

When using the waveguide film 90 as shown in FIG. 11A, an optical semiconductor module similar to the first embodiment can be produced if a holding member similar to the holding member 20 employed in the first embodiment is used.

Figure 12:
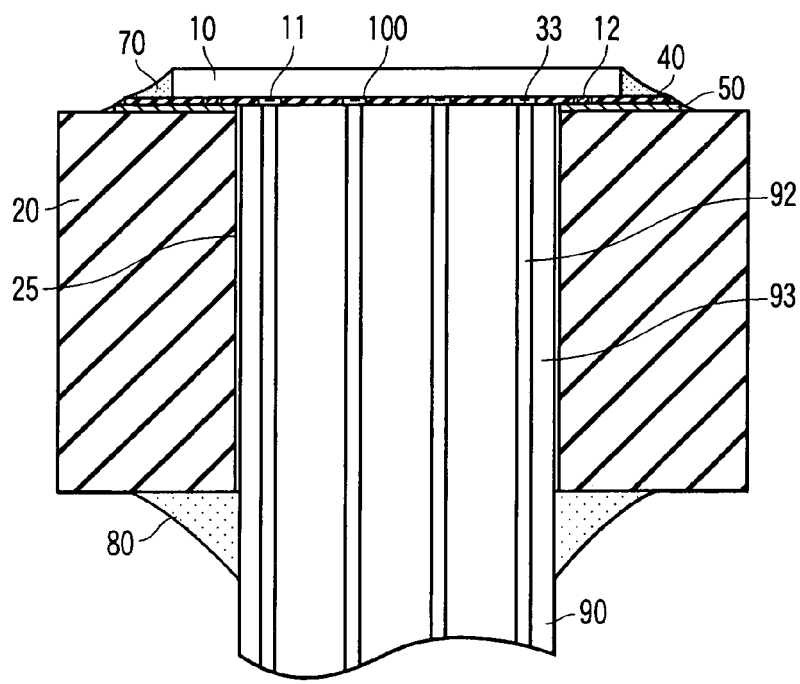
FIG. 12 is a schematic sectional view illustrating an optical semiconductor module using the waveguide film of FIG. 11A instead of the optical fibers employed in the first embodiment.

When using the waveguide film 90 as shown in FIG. 11B, a single slim hole 25 is formed in the holding member 20 as shown in FIG. 12, instead of a plurality of small holes 21, and the film waveguide 90 is inserted into the hole 25. In this case, the same advantage as that of the first embodiment can be acquired by securing the waveguide film 90 to the holding member 20 with an end portion of the cladding 93 of the waveguide film 90 kept in contact with the insulation film 40.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical semiconductor module comprising:
   an optical transmission channel including a waveguide which transmits a light beam, and an end at which a part of the waveguide is exposed;
   a holding member including a surface, the holding member mechanically holding the optical transmission channel with the end of the optical transmission channel being exposed from the surface;
   an optical semiconductor element, being mounted above the surface of the-holding member including an active area to emit or receive a light beam and an electrode pad being electrically connected to an electric wiring, the active area being optically coupled to the waveguide at the end of the optical transmission channel; and
   a three-layer film interposed between the optical semiconductor element and the optical transmission channel, the three-layer film including an insulation layer, a wiring layer and an adhesive layer, the three-layer film including a plurality of openings each corresponding to an optically coupling portion between the active area of the optical semiconductor element and the waveguide of the optical transmission channel, the adhesive layer being adhered to the surface of the holding member, the wiring layer being electrically connected to an electrode pad of the optical semiconductor element, a portion of the end of the optical transmission channel being pressed against the wiring layer or the insulation layer.

2. The optical semiconductor module according to claim 1, wherein the three-layer film is extended from the surface of the holding member to a side surface of the holding member.

3. The optical semiconductor module according to claim 2, wherein a corner between the surface and the side surface of the holding member is chamfered, the three-layer film being formed on the corner.

4. A method of producing the optical semiconductor module as specified in claim 1, comprising:

adhering the three-layer film to the surface of the holding member;

mounting the optical semiconductor element on the surface of the holding member with the three-layer film provided thereon, and electrically connecting the electrode pad of the optical semiconductor element to the wiring layer included in the three-layer film;

mounting an optical transmission channel on the holding member; and fixing the optical transmission channel to the holding member after bringing the end portion of the optical transmission channel into contact with the wiring layer or the insulation layer, the end portion of the optical transmission channel being other than the waveguide inserted through the optical transmission channel.

* * * * *